United States Patent
Broghammer et al.

(10) Patent No.: US 7,140,819 B2
(45) Date of Patent: Nov. 28, 2006

(54) ADJUSTMENT DEVICE FOR A FINE MACHINING TOOL

(75) Inventors: Hans-Peter Broghammer, Rottweil (DE); Rolf Ehrler, Teningen (DE)

(73) Assignee: Joerg Guehring, Albstadt (DE)

( * ) Notice: Subject to any disclaimer, the term of this patent is extended or adjusted under 35 U.S.C. 154(b) by 154 days.

(21) Appl. No.: 10/696,152

(22) Filed: Oct. 29, 2003

(65) Prior Publication Data

US 2004/0191022 A1  Sep. 30, 2004

(30) Foreign Application Priority Data

Oct. 29, 2002  (DE)  ............................ 202 16 739 U

(51) Int. Cl.
*B23C 5/00* (2006.01)

(52) U.S. Cl. .................... 409/234; 409/232; 408/156; 408/147; 408/118; 408/180; 279/2.08; 279/4.03; 279/137; 279/4.05

(58) Field of Classification Search ................ 409/234, 409/232; 408/156, 153, 147, 154, 117–118, 408/180, 181; 279/2.08, 2.06, 4.03, 137, 279/4.05, 4.06; 82/1.2, 1.5, 1.4
See application file for complete search history.

(56) References Cited

U.S. PATENT DOCUMENTS

| | | | | |
|---|---|---|---|---|
| 4,224,846 A | * | 9/1980 | Eysel et al. ................... 82/158 |
| 4,443,140 A | | 4/1984 | Boretto | |
| 4,941,782 A | * | 7/1990 | Cook ........................ 408/147 |
| 5,427,480 A | * | 6/1995 | Stephens ..................... 408/168 |
| 5,704,742 A | * | 1/1998 | Reinauer ..................... 408/156 |
| 5,865,573 A | * | 2/1999 | Kress ........................... 408/57 |
| 6,179,530 B1 | * | 1/2001 | Retzbach et al. ......... 408/239 R |
| 6,243,962 B1 | * | 6/2001 | Brock ........................ 33/542 |
| 6,247,878 B1 | * | 6/2001 | Musil et al. ................. 408/1 R |
| 6,270,295 B1 | * | 8/2001 | Hyatt et al. ................. 408/147 |
| 6,846,136 B1 | * | 1/2005 | Brock et al. ................ 408/154 |
| 7,052,217 B1 | * | 5/2006 | Johne ........................ 408/156 |
| 2005/0044686 A1 | * | 3/2005 | Huijbers et al. .............. 29/428 |

FOREIGN PATENT DOCUMENTS

| | | | |
|---|---|---|---|
| DE | 3721521 A1 | * | 1/1989 |
| DE | 4015149 A1 | * | 11/1991 |
| DE | 94 11 260 U | | 10/1994 |
| WO | WO 02 060624 A | | 8/2002 |

* cited by examiner

*Primary Examiner*—Erica Cadugan
(74) *Attorney, Agent, or Firm*—Boyle Fredrickson Newholm Stein & Gratz S.C.

(57) ABSTRACT

An adjustment device for adjusting the position of at least one cutter of a fine machining tool, particularly a reamer, with respect to a cutter support (ST) is described. To allow the cutter to be adjusted as precisely as possible, the cutter support (ST) borders at least one pressure chamber (DK) which is arranged in the adjustment direction of the cutter (S) with a displacement with respect to it and which is filled with a pressure medium which can be placed under pressure using a pressure generation device. Between the cutter (S) and the pressure chamber (DK), a cutter support wall (W) remains which is elastically deformable upon application of pressure by the pressure transfer means to adjust the cutter position.

15 Claims, 12 Drawing Sheets

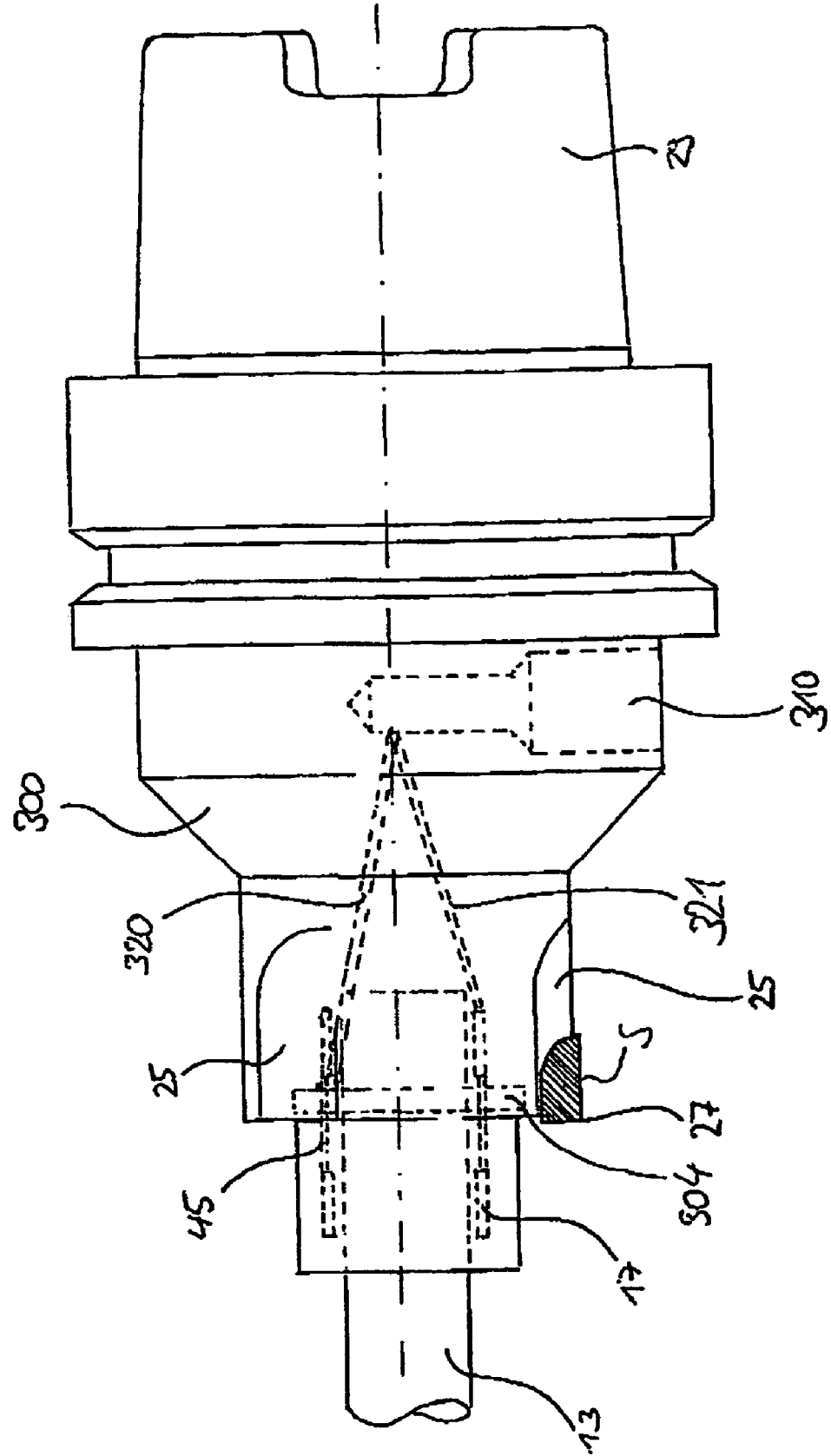

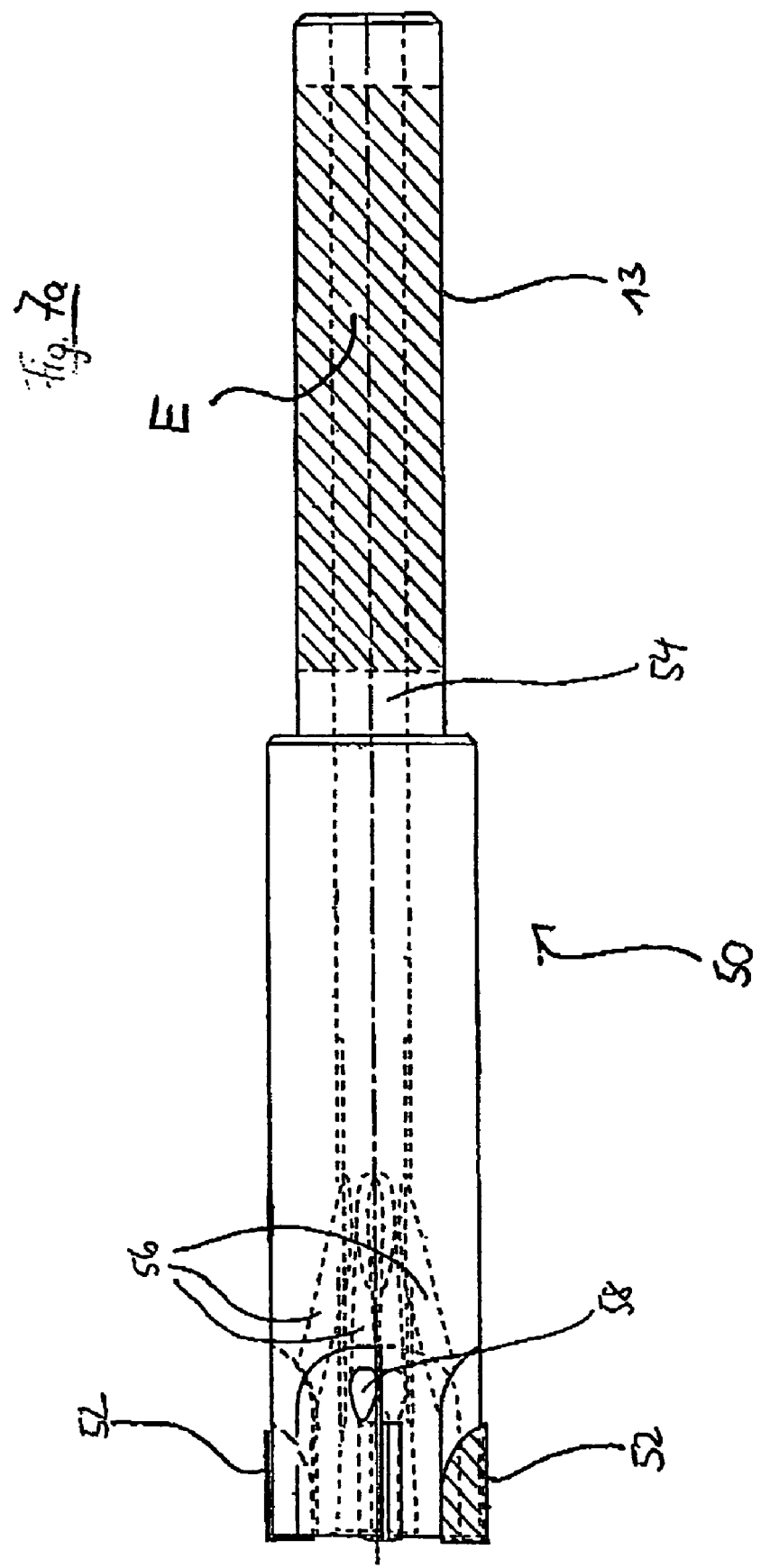

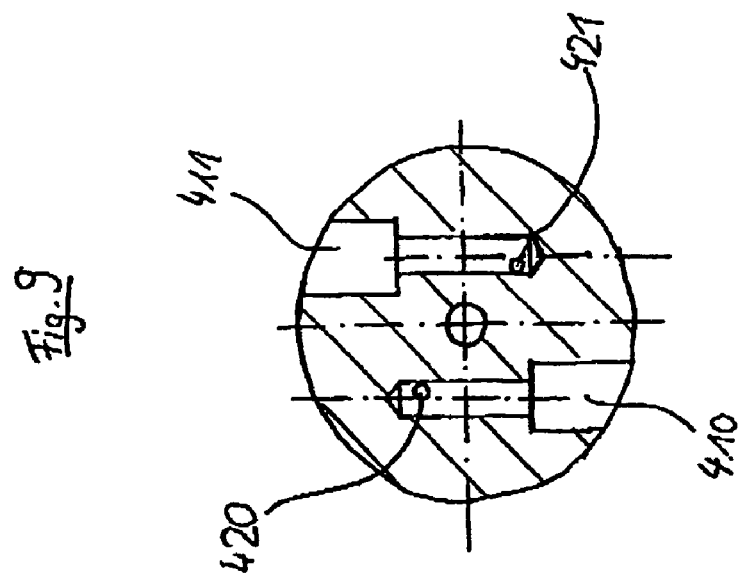
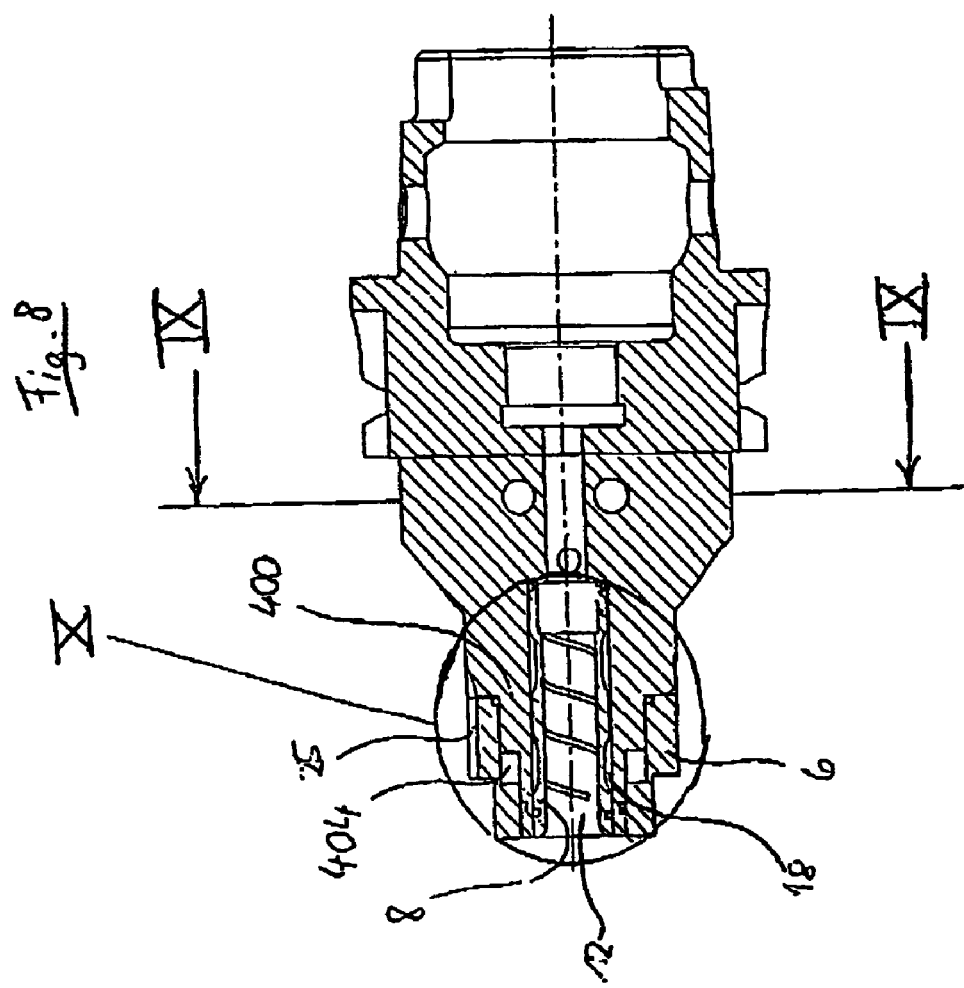

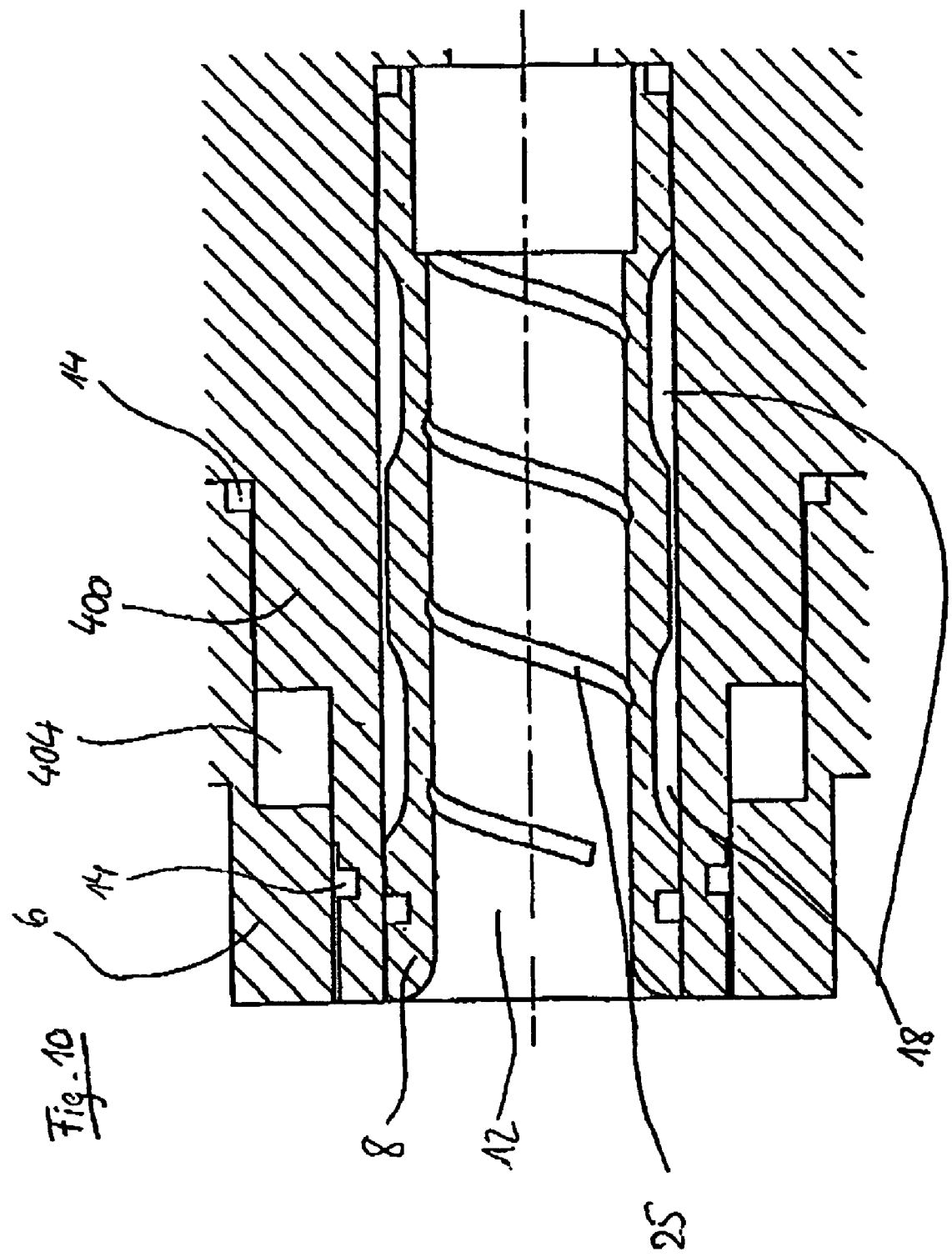

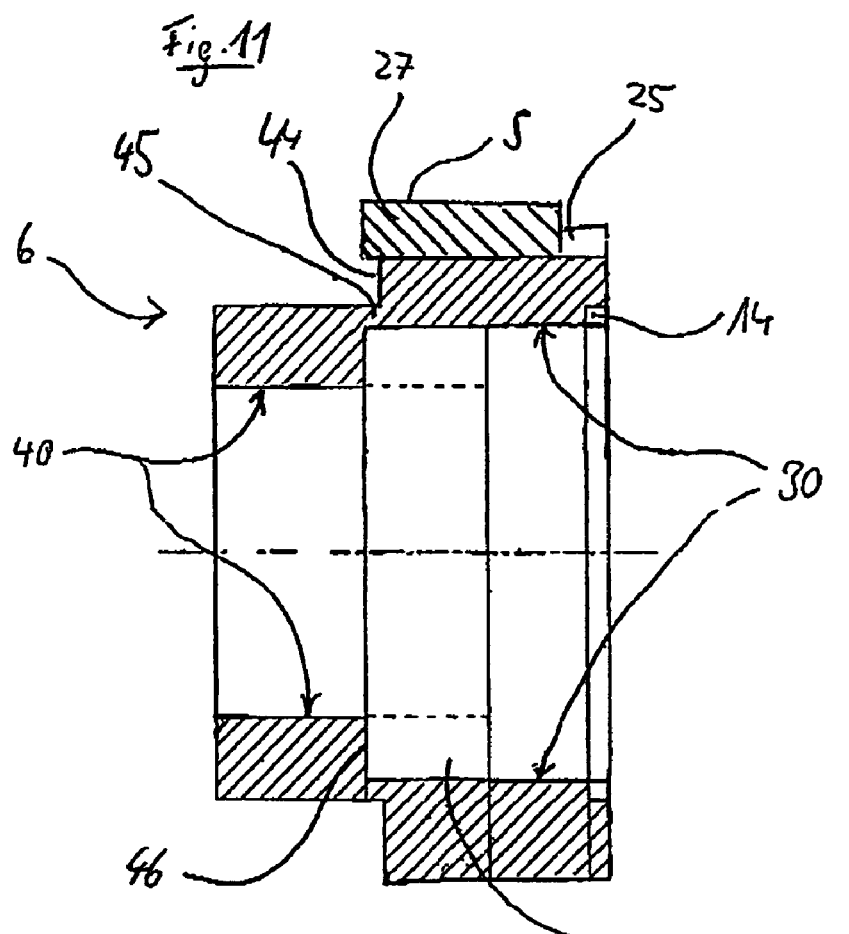
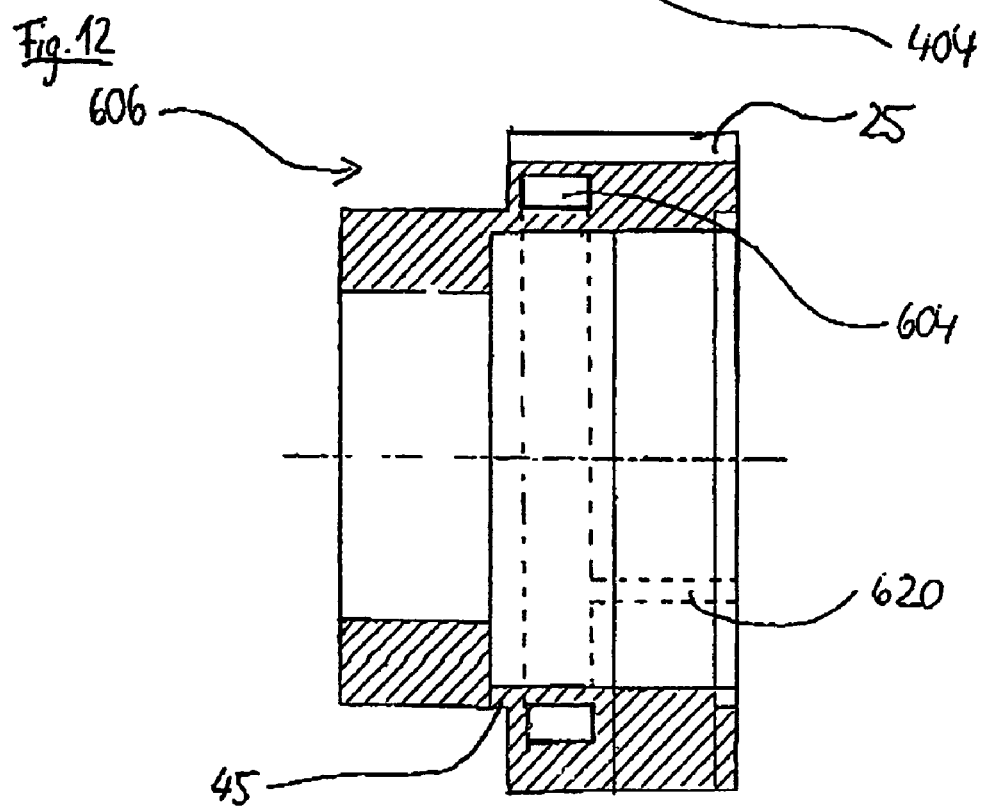

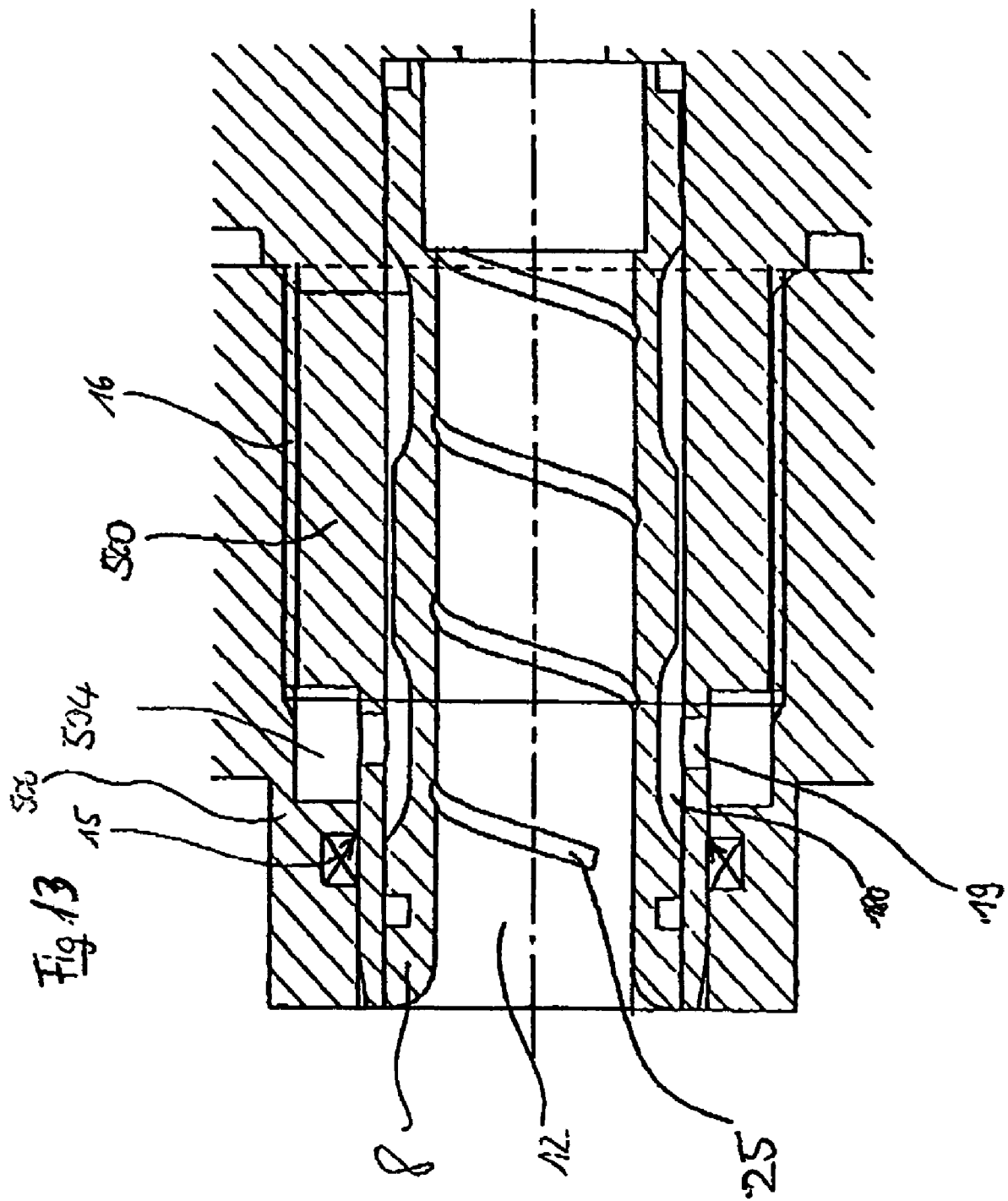

ADJUSTMENT DEVICE FOR A FINE MACHINING TOOL

BACKGROUND OF THE INVENTION

1. Field of the Invention

The invention relates to an adjustment device for adjusting the position of at least one cutter of a fine machining tool, particularly a reamer, with respect to a cutter support, as well as to a corresponding fine machining tool.

2. Description of Related Art

In fine machining tools of this sort, one of the accuracy requirements is that the cutting edges must move in an orbit which is well centered on the rotational axis of the tool. Various solutions to solving this problem are known:

To enable precisely centered restraint of a tool shank, e.g., a drill shank or a burr shaft, hydraulic expansion chucks are known, for example, from DE-GM 94 11 260 or DE 27 00 934 A1 in which a toroidal chamber in the clamping chuck element is bordered radially inwards by an expansion bush which elastically deforms inwards in the radial direction upon placement of a hydraulic pressure in the toroidal chamber and which thus rigidly clamps on all sides the tool shank which is pushed into the receiving hole. Expansion chucks of this sort are known, for example, from the January 2002 edition of the brochure "Höher, schneller, weiter . . . " (i.e., "Higher, faster, further . . . ") from the company Hauser HSC-Technologie.

To allow precisely centered chucking of hollow cylindrical components, expansion mandrels are known on the other hand which also operate using hydraulic pressure and have a toroidal chamber which is bordered radially outwards by an expansion bush. Centered chucking of the workpiece occurs through extension of the expansion bush.

Moreover, in the German utility model DE 296 14 727 U1, a hydraulic expansion chuck is shown in which a tool shank is restrained and on which on the outside additionally a hollow-cylindrical tool is chucked. A ring-shaped pressure chamber is used which has an outer wall which is elastically deformable in a radially outwards manner and an inner wall which is elastically deformable in a radially inwards manner. Using a screw which when it is screwed into a hole presses on a piston in a hydraulic cylinder which is connected via connecting channels to the toroidal chamber, a hydraulic pressure is applied. This results in an extension of the inner and outer walls of the toroidal chamber, it being possible to rigidly restrain or rather chuck the tool shank as well as the hollow cylinder over their entire circumference.

All of these previously known clamping means have in common that they allow highly centered restraining or chucking of the tools or rather the workpieces.

Fine machining tools such as reamers for large diameters or honers as are used, for example, for honing cylinders, have cutters which (e.g., attached on a clamping ring) are clamped on a clamping mandrel. The cutters are thus situated radially outside and without any larger axial offset directly on the chucking. It is prevented in this manner that a centering error can accumulate along the protruding drill length up to the drill bit. However, the problem that arises is that the work is subject to extremely small diameter tolerances, i.e., the position of the cutting edge(s) must be set precisely in the radial direction.

On the other hand, in precision boring tools the axial position of the cutting edges can be critical, e.g., with respect to a zero point of a CNC coordinate system. Using the known chucking and restraining apparatuses, it is possible to achieve high concentric accuracy and vibration-damped tool restraining, but the fine adjustment of the position of the cutters which is desirable for fine machining tools cannot be achieved in this manner.

SUMMARY OF THE PRESENT INVENTION

The object of the present invention is thus to create an adjustment device for a fine machining tool which can be used to set the position of the cutter(s) with respect to a cutter support as accurately as possible as well as a fine machining tool with an adjustment device of this type.

This objective is solved with respect to the adjustment device and with respect to the fine machining tool.

Further refinements are the subject of the dependent claims.

The adjustment device according to the invention uses the expansion chuck technology which is known per se from the prior art for chucking or restraining tools on expansion mandrels or expansion chucks in which expansion chuck technology hitherto a tool is clamped in a chuck or on a mandrel through material extension on the tool support. With the adjustment device according to the invention, however, it is possible for the first time to finely adjust the position of the tool cutter with respect to a cutter support.

Through an offset of the cutter with respect to the pressure chamber in the adjustment direction, it is achieved that an extension of the outer wall of the pressure chamber or rather of the cutter support caused by an application of pressure by the pressure transfer means in the pressure chamber leads directly to a positional displacement of the cutter. Through appropriate manipulation of the pressure generation device, the position of the cutter can be adjusted in the desired manner.

As has been shown in trials with the fine machining tool according to the invention, it is possible to meet tolerances in the range of $\frac{1}{1000}$ mm, whereas adjustments of approx. $\frac{1}{10}$ mm are limiting. Pressures of up to 1000 bar were used. A large pressure increase in the pressure chamber corresponds to only a very small extension of the pressure chamber outer wall (of the expansion outer wall section of the support member). The adjustment device according to the invention thus acts like a lever so that the extension can be metered very precisely.

In one advantageous embodiment, the pressure chamber and the cutter to be adjusted are arranged in the adjustment direction on a line, i.e., the pressure chamber lies exactly below the cutter(s). The wall extension induced by the adjustment device then acts directly upon the cutter. However, other geometries are also imaginable, particularly in case of predetermined geometric outer dimensions of the fine machining tool which do not admit any other structural shape.

In tools in which it is important to have the most parallel arrangement possible of the cutting edges with respect to the rotational axis over the entire edge length, e.g. in case of honing stones in honing tools, it is advantageous if the pressure chamber under the cutter extends over the entire (axial in case of honing tools) length of the cutting edge. In this manner, a parallel displacement of the entire cutter is guaranteed.

In other tools such as reamers, the primary concern relates to the region of the cutting edges near the tool corner. In this case, it is advantageous to arrange the pressure chamber only under the region of the tool corner in order to direct the entire transfer of force to the region near the point and thus achieve efficient usage of the pressure. It can even be desirable to adjust a cutter at an angle, e.g., in a clearance angle setting.

It is preferred to use an (at least approximately) incompressible fluid as the pressure transfer medium in the pressure chamber of the expansion chuck device, with a particular preference for hydraulic oil, since in this manner in the elastic region of the extension also an at least approximately linear transfer function of the force applied with the pressure generation device and of the wall extension, or rather of the cutter adjustment can be obtained in this manner. In case of liquid-lubricated tools, in contrast, a filling with the lubricant is also possible under certain circumstances.

By using a plastic or rather elastomer bush or rather insert, on the other hand a change in the transfer behavior during heating, trapping of air or leaks can be prevented so that the desired cutter adjustment can be achieved reliably. A gel is also imaginable in this context.

It is advantageous for pressure generation to provide a screw which can be screwed into a threaded hole which is connected to the pressure chamber. The fine adjustment can then be effected by means of a change in the volume which the pressure transfer medium assumes by screwing in the screw to the desired screw-in depth.

Within the sense of good accessibility and in order to also enable small outer diameters of the tool on the reinforced cutting edge section, the pressure application device is separated from the expansion chuck device advantageously over an axial distance. Advantageously within the sense of low leakage losses, the screw guided into the blind hole presses on a hydraulic piston guided in a hydraulic cylinder.

Alternatively, the pressure can be exerted on the hydraulic cylinder also via a corresponding pump.

Moreover, it is advantageous if there is already an allocation of certain values of the input quantity of the pressure generation device, in the case of the screw thus, say, the screw's angle of rotation, to corresponding positional adjustment values of the cutter, i.e., if, for example, it is known how the corresponding extension turns out at a certain temperature, wall strength of the expansion outer wall section, etc. Based on a calibration of this sort, it is then possible to finely adjust the diameter based on the force of the pressure application device without a verification (e.g., a dimensional check) on the cutter being necessary.

The adjustment device according to the invention is particularly suitable for a radial adjustment of the cutter(s). Here, it is advantageous if the pressure chamber is formed with a ring shape, particularly in multiple-edged tools. The uniform pressure distribution over the entire circumference and thus uniform extension lead advantageously to a desired centering of the cutters on the longitudinal axis of the tool and thus to a high concentric accuracy of the cutters. Within the sense of the most direct force transfer possible, however (particularly in case of a single-cutter) a configuration of the pressure chamber is also imaginable in which the pressure chamber is restricted to the local circumference section of the cutter.

The cutter support is a tool mounting basic element, which is equipped, say, with a coupler which is suitable for HSK or SK systems, so that the fine machining tool can be used on common machine tools, particularly CNC machines. For example, a screw connection of indexable or exchangeable cutting inserts can be provided on the tool mounting basic element here also in combination with the other embodiments. A configuration with three cutters has proven to be particularly suitable for fine machining tools such as reamers. As alternatives, however, cutters that are soldered on or cutters which are rigidly present on the basic element are also generally imaginable.

In order to be able to use standardized tool mounting basic elements, the at least one cutter is arranged, according to the advantageous further development, not directly on the tool mounting basic element but instead it is chucked using a support ring which thus forms the cutter support. Here, the ring-shaped pressure chamber is particularly advantageous since in this manner the chucking of the support ring can be effected simultaneously in a centered manner.

Here, the pressure chamber can be molded entirely in the cutter support ring. This results in a support ring which can be distributed separately which does not require any special tool basic elements. However, it is easier to manufacture if the pressure chamber is bound on the one hand by the tool mounting basic element and on the other hand by the installed cutter support ring. Particularly when using fluids as the pressure transfer means, a sealing of the gap between the cutter support ring and the basic element is required. The sealing can be provided by a solid interference fit of the ring on the basic element. On the other hand, the sealing can take place also by means of a circumferential soldering with which the support ring can be simultaneously attached on the basic element. The use of shaft seals, 0-rings or similar types of seals is also imaginable.

The proposed adjustment device is suitable particularly also for step fine machining tools. For this purpose, the tool mounting basic element has a central tool holder into which a tool shank of an additional tool can be advantageously restrained using an expansion chuck. Other chucks are also imaginable, but the use of an expansion chuck has proven expedient due to the good concentric accuracy. There is also the additional advantage that a coupling of the adjustment device according to the invention with the expansion chuck can be effected.

Thus, the pressure chamber can be used both for the expansion chuck and also for the adjustment device. This results in a comparably simple and cost-effective design of the tool. On the other hand, it must be noted that the inner wall of the pressure chamber is pressed against the centrally restrained tool, whereas the outer wall of the same pressure chamber acts as an extension element belonging to the adjustment device, resulting in an undesired but unavoidable coupling of the two clamping systems. An adjustment of the cutters arranged on the outer circumference is thus possible only more in a parameter range which takes into account the restraint of the central tool.

In a further advantageous embodiment, the tool thus has separate pressure chambers for the expansion chuck and adjustment device which are connected via a pressure coupling. This design is more costly, but in this manner at least the position, shape and size of the pressure chamber of the adjustment device can be selected independently of the expansion chuck. However, the pressure in the two systems remains a common quantity since the pressure chambers have a pressure coupling.

The pressure of the adjustment device is thus still not independently selectable from that of the clamping chuck, but through clever choice of the geometry of the pressure chambers or rather the wall thickness of the extension walls, it is possible to ensure that within a desired range despite the pressure adjustment for setting the position of the cutters arranged on the outer circumference a sufficiently rigid restraint of the central tool is retained. Due to the pressure coupling, however, a pressure generation device can be used in common so that a separate connection of the pressure chambers to the pressure generation device is not required, which can result in cost benefits.

Moreover, it would at least be theoretically conceivable to limit the pressure coupling in the desired manner to certain pressure regions by means of pressure limiting valves or the like.

A complete separation of the expansion chuck from the adjustment device can be more expensive. However, in this case with minimal mutual influence it is possible on the one hand to adjust the cutter position of the (step) cutters and on the other hand the clamping force of the expansion chuck for holding the (rough-cutting) central tool.

Insofar as it appears expedient, the individual features of the embodiments can be arbitrarily combined. The invention is also not limited to the named embodiments; for example, besides a one-dimensional, particularly radial cutter adjustment, a multidimensional, say, simultaneously radial and axial cutter adjustment, is possible without leaving the scope of the invention. Here, two walls of a pressure chamber can act as extension walls, but multiple pressure chambers with each having an extension wall can also be provided.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred embodiments of the invention are explained hereafter in greater detail based on schematic drawings. The figures are as follows:

FIG. 7 is a lateral view of a further embodiment of the fine machining tool according to the invention;

FIG. 7a is a lateral view of a centrally restrained reamer according to the invention;

FIG. 8 is a lateral view of a further embodiment of the fine machining tool according to the invention;

FIG. 9 is a cross-sectional view of the embodiment shown in FIG. 8 along the line IX—IX;

FIG. 10 is a detailed view of detail X in FIG. 8;

FIG. 11 is a sectional view of a cutter support ring for the fine machining tool shown in FIGS. 8 to 10;

FIG. 12 is a sectional view of a further embodiment of the cutter support ring;

FIG. 13 is a section of a further embodiment of the invention;

DETAILED DESCRIPTION OF THE PREFERRED EMBODIMENTS

Figure 1:
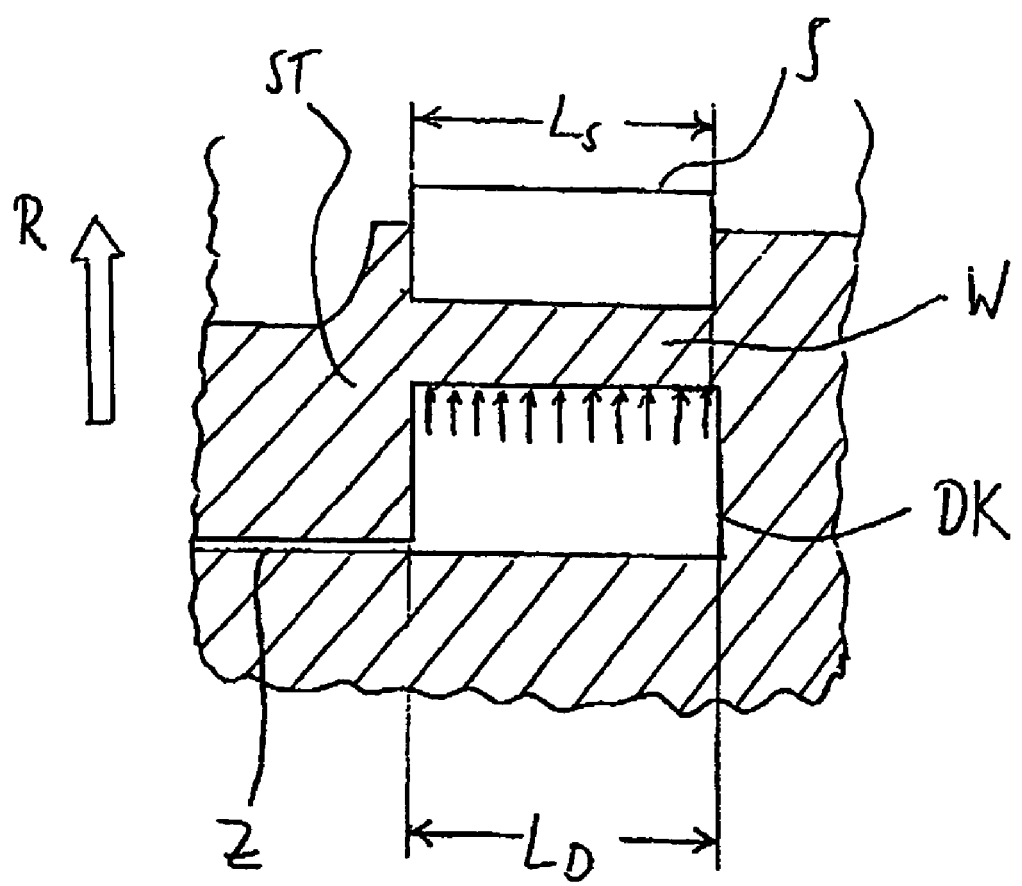
FIG. 1 is a basic schematic drawing which is used to explain the adjustment device according to the invention.
Figure 2:
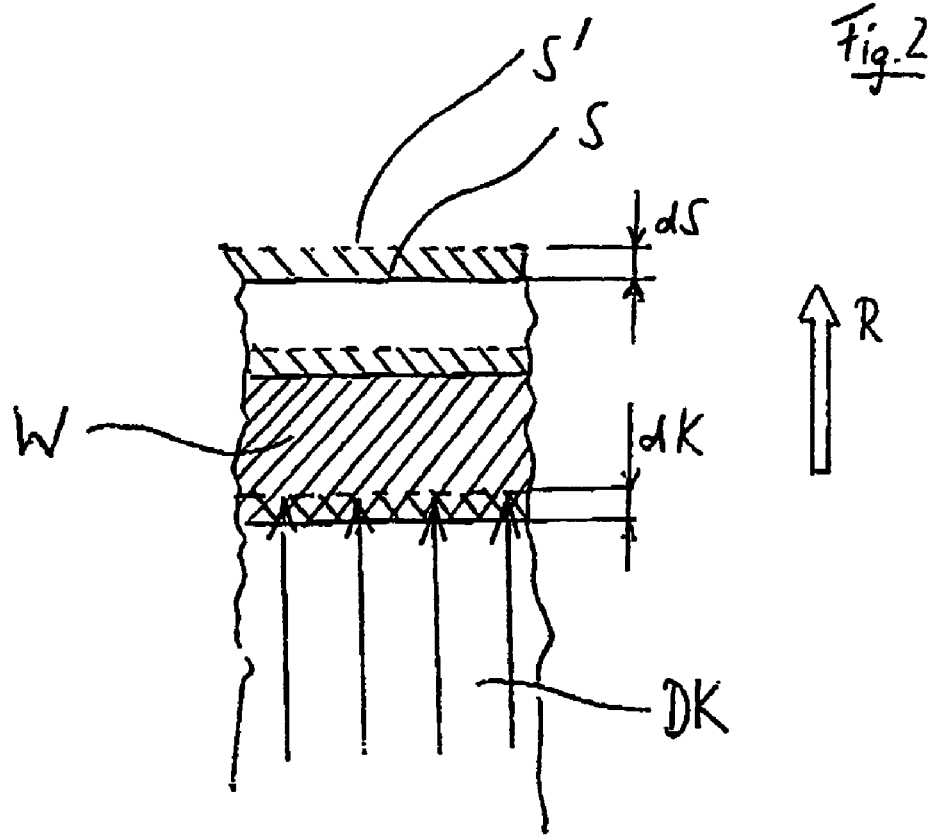
FIG. 2 is an enlarged section from the drawing in FIG. 1.

Reference is made initially to FIGS. 1 and 2, and the principle of operation of the adjustment device according to the invention will be explained. A pressure chamber DK is arranged below a cutter S which pressure chamber DK is filled with a pressure transfer means and has a pressure applied to it via a line Z. Between the cutter S on an exchangeable cutting insert and the pressure chamber DK, there is an outer wall W of the pressure chamber DK having a small thickness while the pressure chamber is otherwise enclosed with fill material. As is shown by the arrows in the pressure chamber DK, the outer wall W of the pressure chamber DK experiences upon application of an external pressure a two-dimensional load. If this load exceeds a certain value, the wall W is deformed in direction R. Since the length $L_D$ of the pressure chamber corresponds to the length $L_S$ of the cutter, there arises over the cutter length $L_S$ in many parts an extension of the pressure chamber to the outside, i.e. essentially a displacement of the wall W to the outside. Particularly on the edges, the wall W is curved and extended so that there arises in remote-edge regions [in regions far from the edge] of the wall W the displacement of the wall W shown in FIG. 2. However, there also occurs an elastic material compression in the displacement direction (i.e., the adjustment direction). Due to the small scale of the compression of the wall W in comparison to the displacement, this effect was intentionally neglected in FIG. 2. The drawing thus shows in an idealized manner an (infinitesimally small) section of the wall W which is pressed outwards under inner pressure in the pressure chamber DK. In the idealized representation, the extension dK of the chamber corresponds to the displacement dS of the cutter.

Figure 3:
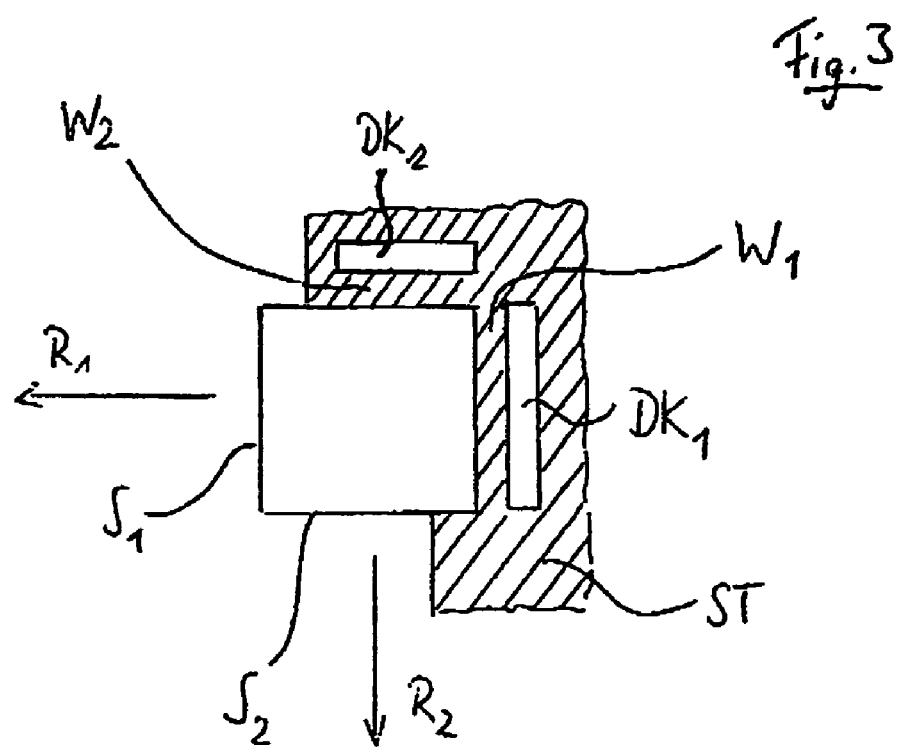
FIG. 3 is a basic schematic drawing of a further embodiment of the adjustment device according to the invention.

As is shown in FIG. 3, an adjustment of this sort can also occur in a multidimensional manner; a first pressure chamber DK1 and a second pressure chamber DK2 press via a wall on an exchangeable insert, the position of the cutter S1 being adjustable with the first pressure chamber in a first direction R1, whereas the position of the second cutter S2 is adjustable with the second pressure chamber DK2 in a second direction R2. In this manner, for example, the radial coordinate of the minor cutter and the axial coordinate of the main cutter can be adjusted to the step cutters of a step drilling or rather reaming tool.

Figure 4:
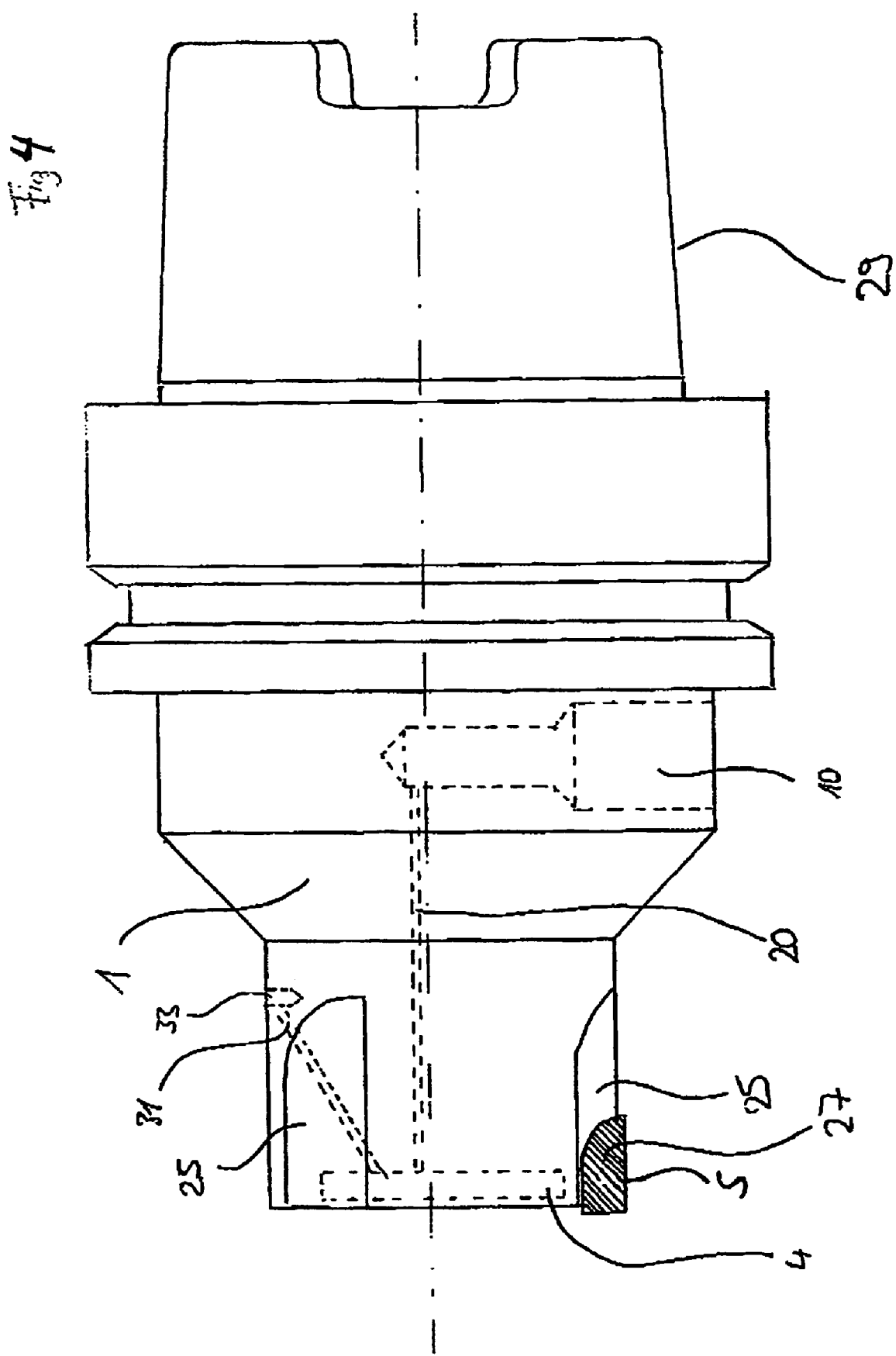
FIG. 4 is a lateral view of an embodiment of the fine machining tool according to the invention.

FIG. 4 shows a three-cutter reamer according to the invention. For coupling to a machine tool, the tool has an HSK interface in the form of a standardized drilled shank with two driving slots. Exchangeable cutting inserts 27 are screwed down on the tool point on the tool mounting basic element 1 in guide tracks 25. The exchangeable cutting inserts 27 have in each case a cutting edge S which extends roughly parallel to the tool's rotational axis (at a small clearance angle). Radially within [inside] the exchangeable cutting inserts 27 with the cutters S there is a pressure chamber 4 which is indicated using a dashed line, which pressure chamber 4 is located axially in the region of the tool corner or rather cutting point. The pressure chamber is connected to a blind hole 10 via a connecting channel 20. By means of an hexagon socket screw which is screwed into the blind hole 10, pressure can be generated and introduced into the pressure chamber using a suitably chosen pressure transfer means, e.g. hydraulic oil. In this manner, the wall between the pressure chamber and the exchangeable cutting inserts experiences a pressure load and is pressed radially outwards. The pressure chamber extends in a ring-shaped manner over the entire circumference of the tool. Due to the uniform pressure distribution on the entire circumference, there arises, besides an equally large radial positional adjustment on all cutters S, a centering of the tool cutters S. Moreover, there arises an angular excursion of the cutting edge with respect to the rotational axis due to the arrangement towards the tool corner of the pressure chamber during the positional adjustment of the cutter. To enable bubble-free filling of the pressure chamber with the hydraulic fluid, moreover, a hole 33 for a ventilation screw is provided which is connected via a branch channel 31 to the pressure chamber 4.

Ventilation of this sort is provided also in the embodiments shown in the further figures. For the sake of clarity, however, this ventilation is not shown in the further figures. Also omitted in the figures is the tool's own coolant supply via which the cutters of the tool can be supplied with coolant from a coolant supply on the machine end. Nevertheless, a built-in cooling of this sort can naturally be provided within the scope of the invention.

Figure 5:
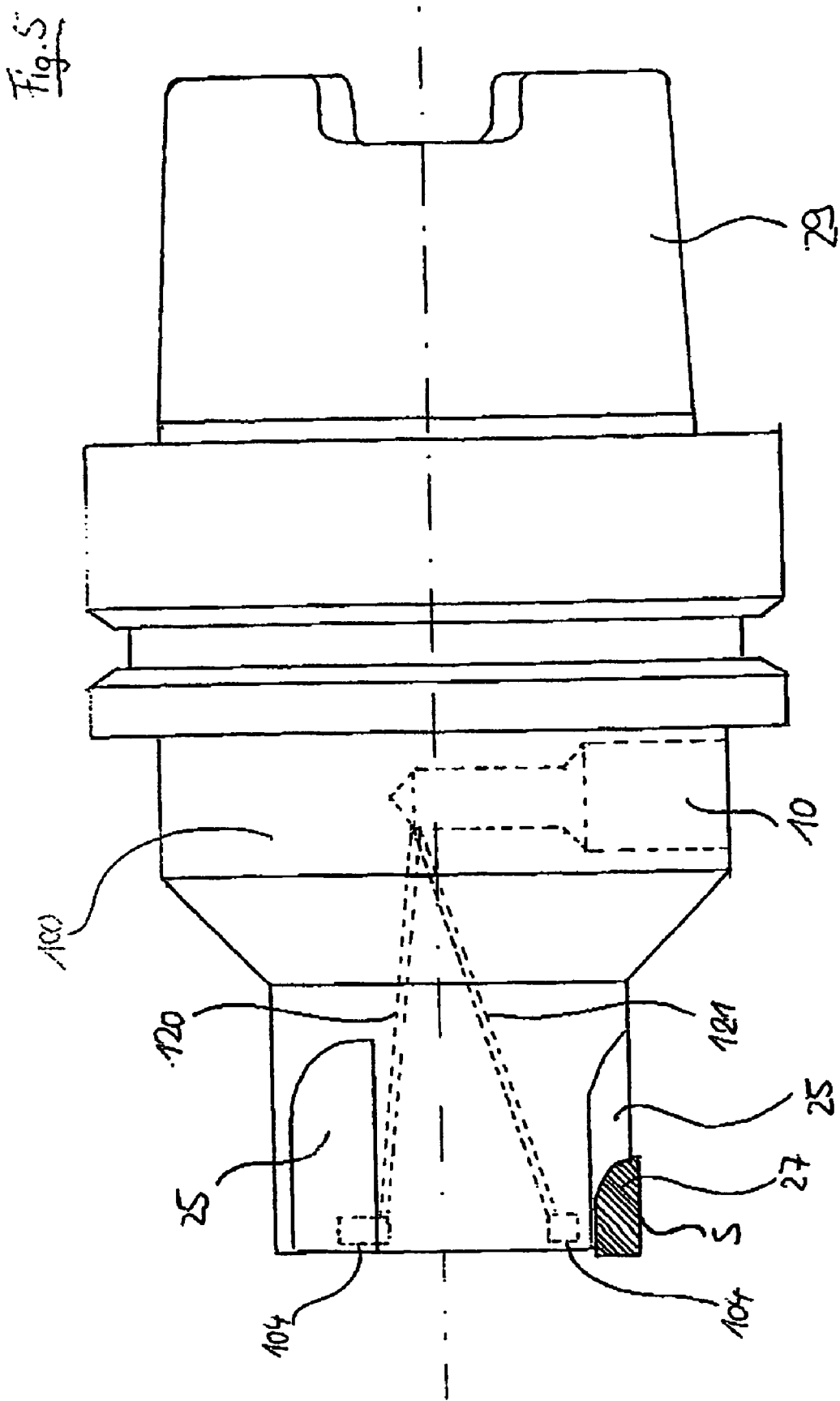
FIG. 5 is a lateral view of a further embodiment of the fine machining tool according to the invention.

FIG. 5 also shows a reamer according to the invention with three cutters 27 and an HSK interface 29. For the sake of clarity, only the sections of the adjustment device belonging to the two cutters facing the viewer are shown with a dashed line. Again, exchangeable cutting inserts 27 are screwed in guide tracks 25 on the tool mounting basic element 100. Unlike the embodiment shown in FIG. 4, however, under each cutter S there is in each case a separate pressure chamber 104 which is locally limited to the cutter region which pressure chamber 104 is connected via connecting channels 120, 121 to the blind hole 10. Due to the smaller chamber volume and the smaller quantity of hydraulic fluid, there arises a more direct transfer of the force applied using the hexagon socket screw.

Figure 6:
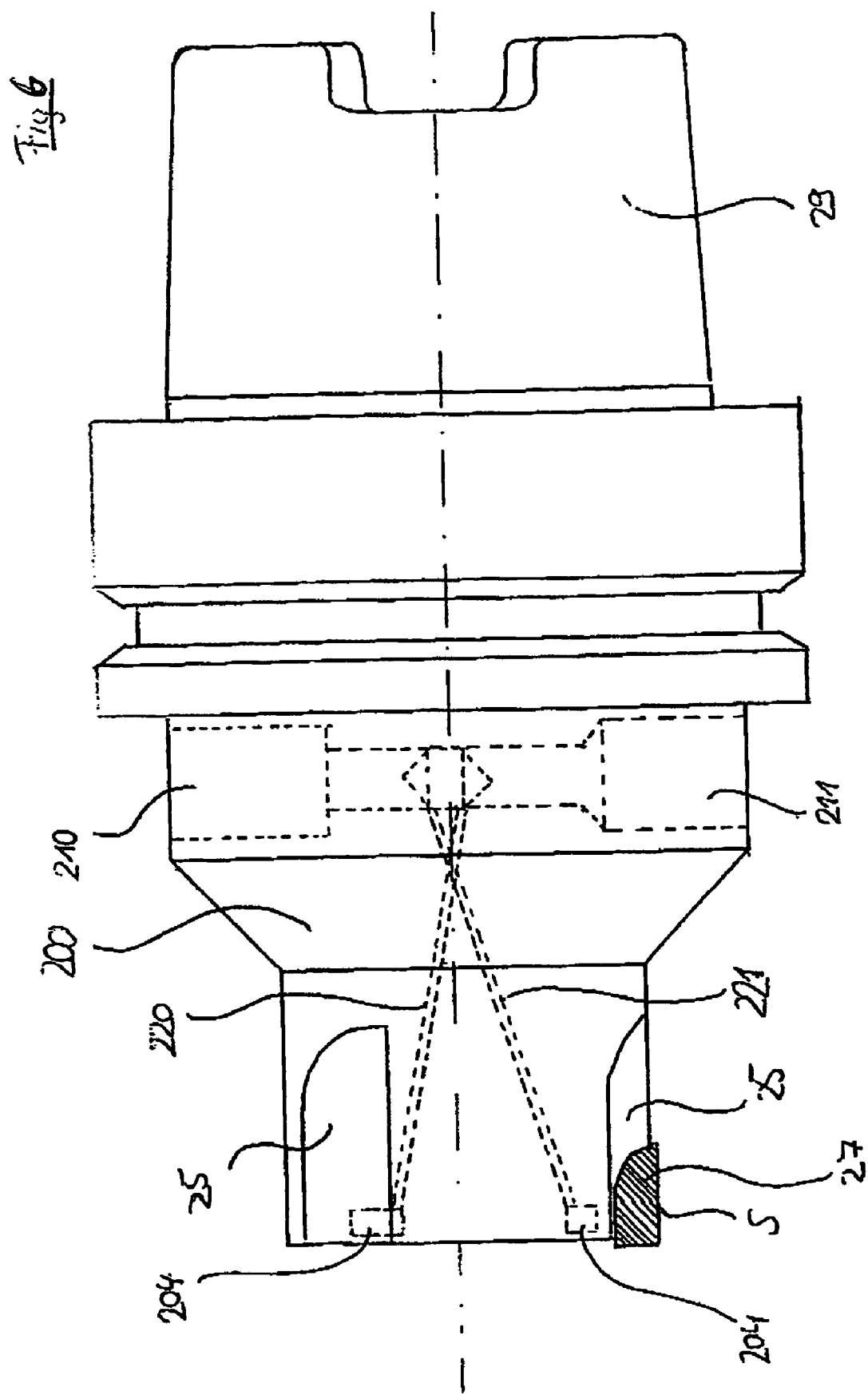
FIG. 6 is a lateral view of a further embodiment of the fine machining tool according to the invention.

Also in the embodiment shown in FIG. 6 of the invention (a three-cutter reamer), only the sections of the adjustment device associated with the two cutters S facing the viewer are shown with a dashed line. The cutters S are individually adjustable. By means of pressure chambers 204 which are located in each case below the tracks 25, the respective cutters S are radially adjustable. Each pressure chamber 204 is connected to a separate blind hole 210, 211 via its own connecting channel 220, 221 and thus can have pressure separately applied to it independently of the adjustment of the other cutters. In this manner, it is possible to compensate a balance error or concentric inaccuracy of the tool suspension or, say, to define a cutter as rough-cutting with a greater radial excursion than the two others in order to assign a purely supporting function to, say, two cutters while only one cutter is actually cutting.

Besides the use of the adjustment device according to the invention in reamers as is shown in FIGS. 4 to 6, the adjustment device is also suitable for step tools, particularly step reamers, in which besides the cutters attached on the outer circumference of the tool mounting additionally centrally a tool shank of an insert tool is restrained in a holder using a clamping chuck. Standard clamping chucks or contraction clamping chucks can be used. However, the use of an expansion chuck is particularly advantageous, the reason being that in fine machining tools configured in this way, parts of the adjustment apparatus can be used simultaneously as a component of the expansion chuck. Step reamers in this configuration of the invention are shown in FIGS. 7 to 13.

The tool 300 shown in FIG. 7 with HSK interface 29 has a hydraulic expansion chuck with two ring-shaped pressure chambers 17 in which a tool shank 13 is restrained. The two ring-shaped pressure chambers 17 of the hydraulic expansion chuck are interconnected via connecting channels 45. Via a further connecting channel 321, the expansion chuck is connected further to a blind hole 310. The step cutters S of the step tool are formed by exchangeable cutting inserts 27 which are applied on a diameter extension of the tool in tracks 25. The cutters S of the exchangeable cutting inserts 27 are radially adjustable by means of an adjustment device, the adjustment device having a ring-shaped pressure chamber 304 in the front region of the cutters S which is connected via a connecting channel 320 to the blind threaded hold 310. Using a screw which can be screwed into the threaded hole 310, the pressure in the ring chambers 17 of the expansion chuck and the ring chamber 304 of the cutter position adjustment device can be simultaneously increased.

For example, a centrally restrainable reamer tool 50 can be restrained in the hydraulic expansion chuck. A tool 50 of this sort is shown in FIG. 7a in an exemplary fashion. In the resulting overall tool, the centrally restrained reamer is then assigned the function of reaming out a first step bore section with a small diameter while a second section of the step bore with a larger diameter is reamed out with the cutters S on the diameter extension of the overall tool.

The step fine machining tool with the hydraulic expansion chuck is particularly suitable for processing bore holes in which the first bore section with the smaller diameter is relatively deep. In this case, in order to enable a reaming of the bore hole in a work procedure before and after the step, as a prerequisite the insert tool 50 must be relatively long, i.e., the cutters 52 of the tool must be relatively far from the restraint E in the expansion chuck. With the expansion chuck, a well centered restraint can be achieved so that the concentric error accumulating up to the tool point is very small and long tool lives and low deviations can be obtained. At the same time, the added cost for the expansion chuck compared to conventional clamping chucks remains within limits due to the synergy effects with the adjustment device according to the invention. The adjustment of the radial position of the step cutters S serves on the other hand to maintain the high dimensional accuracy in the prebore section also in the region of the larger diameter of the bore hole.

The insert tool 50 shown in FIG. 7a for restraint in the central hydraulic expansion chuck of the tool according to the invention in the embodiments in FIGS. 7 and 8 through 13 provides moreover a built-in coolant supply. Via a central cooling channel 54 along the tool's longitudinal axis, coolant can be fed from a coolant supply provided on the machine end via distribution channels 56 to the cutters 52 which emanates on outlet openings 58. It is possible to use the lubricant employed for cutter cooling/chip removal also for filling the pressure chambers of the adjustment device according to the invention or rather of the expansion chuck.

A further embodiment of the fine machining tool according to the invention is shown in FIGS. 8 to 11.

In contrast to the embodiment of the invention shown in FIG. 7, a positional adjustment of the (three) step cutting edges is possible here independently of the restraining pressure of the expansion chuck. In the embodiment in FIG. 7, the pressure chamber of the adjustment device is placed under pressure by tightening the same screw as the pressure chambers of the expansion chuck. In contrast, in the embodiment shown in FIG. 8, there is no pressure coupling between the pressure chamber 404 of the adjustment device for adjusting the position of the step cutting edges and the pressure chambers 18 of the hydraulic expansion chuck.

As can be seen particularly in FIG. 9, two separate blind holes 410, 411 for holding pressure screws are provided on the tool mounting basic element 400. The blind hole designated as 410 is connected via a connecting channel 420 to the pressure chamber 404, while the blind hole designated as 411 is connected via a further connecting channel 421 to the pressure chambers 18 of the hydraulic expansion chuck. Pressure regulation on the screws thus takes place separately for the hydraulic expansion chuck and the adjustment device.

A bush 6 is placed on the tool mounting basic element 400 which bush 6 is shown in detail in FIG. 11. The basic element 400 and the bush 6 enclose the ring-shaped pressure chamber 404 which is connected to the blind hole 420 and a ventilation hole (not shown) via the channel 421 drilled into the basic element 400 and a ventilation channel. The pressure chamber 404 is indicated in FIG. 11 using a dashed line. As can be seen, it is located axially at the height of the tool corner of the cutter S. The cutter S is formed on an exchangeable cutting insert 27 which is held in a track 25.

The cutting inserts protrude on their front end somewhat over a shoulder 44 on which the expansion bush 6 tapers. On the inside, the region forming the pressure chamber 404 is also bordered towards the tool point by a shoulder 46. The shoulder 46 extends essentially on a plane [level] with the axial cutting edge of the exchangeable insert 27. Under the tool corner, there is thus a material weak point 45 in the material course of the bush 6. In this manner, a particularly large deformation of the outer wall of the pressure chamber 404 below the tool corner is caused and simultaneously the material in the front region (towards the tool point) of the expansion bush 6 is decoupled from the extension wall.

The bush 6 has on the inside on the regions 30, 40 on which it is pressed onto the tool basic element 400 a good surface quality in order to ensure a snug fit of the bush 6 on the basic element 400.

A certain sealing of the pressure chamber 404 takes place already in this manner. Additionally, on one side of the pressure chamber 404 on the axial end of the bush 6 as well as on the opposite side of the pressure chamber 404 on the basic element 400 in each case a circumferential groove is provided which upon assembly of the bush is filled with solder or filler metal and thus allows a rigid soldering of the bush 6 on the basic element 400 and thus a good sealing of the pressure chamber 404 to the outside.

FIG. 12 shows the expansion bush 606 as a modified embodiment. In terms of the essential parts, it has the same design as the expansion bush shown in FIG. 11, but it has a ring-shaped pressure chamber 604 molded into the material of the bush, which pressure chamber 604 can be connected via a drilled-in channel 620 to a corresponding pressure means supply and would thus also be adaptable to a tool mounting basic element 400 with minor modifications.

On the tool mounting basic element 400, moreover, an expansion lining 8 is slid into the central tool holder 12 which is also soldered to the basic element 400 and is thus fastened on the basic element 400 in a manner that is sealed to the environment. Between the expansion lining 8 and the basic element 400, two ring-shaped pressure chambers 18 are enclosed which are connected via narrow slots. The pressure chambers are connected via the connecting channel 421 to the blind hole 411 with which the restraining pressure of the clamping chuck is controlled. Due to the lower wall strength toward the outside of the pressure chamber 404 and the inside of the pressure chambers 18 than on the side directed towards one another, there arises only a marginal mutual influence between the two expansion chuck hydraulics so that the position of the cutters S can be adjusted independently of the clamping force of the hydraulic expansion chuck with great precision. In order to hold dirt or oil residue clinging to a tool shank, an additional circumferential groove 25 is provided moreover on the inside on the expansion lining.

Finally, FIG. 13 shows an embodiment of the step fine machining tool according to the invention in which the pressure chamber 504 of the adjustment device is connected via a radially drilled-in connecting passage 19 to the pressure chambers 180 of the hydraulic expansion chuck. The expansion bush 506 placed outside on the tool basic element 500 has on its rear section an inner winding 16 with which it can be screwed onto a corresponding outer winding on the basic element 500. On the front side, another seal 15 is provided moreover to seal the pressure chamber 504.

The screw provided for adjusting the pressure was not shown in any of the shown embodiments. However, it is clear that within the scope of the invention, sealing measures to seal the clamping hydraulics can be undertaken. In particular, it can be provided that the screw does not directly reduce the hydraulic fluid volume but does this instead via a piston which is guided in a hydraulic cylinder in a well sealing manner.

Besides pressure control via a hexagon socket screw by means of an Allen key, etc., there exists for the named embodiments a further expedient configuration involving an attachment on the hexagon socket screw, e.g., a thumb wheel provided with a marking. Using a scale plotted over the circumference of the thumb wheel to be placed thereupon, it is then possible through alignment of the marking on the wheel with the scale to effect direct control of the cutting edge adjustment. Besides the invariable geometry of the tool mounting, the scale necessarily relates to specified operating quantities of the adjustment device, i.e., say, the temperature, hydraulic fluid, etc. The identifier plotted as the scale can thus replace only under the specified conditions an iterative cutter adjustment (turning of the screw, measurement of the cutter adjustment on the cutter, retightening of the screw, etc.). However, even under different operating conditions, the operator is provided with an initial point of reference regarding how far to turn the screw in order to produce the desired cutter adjustment.

Figure 15:
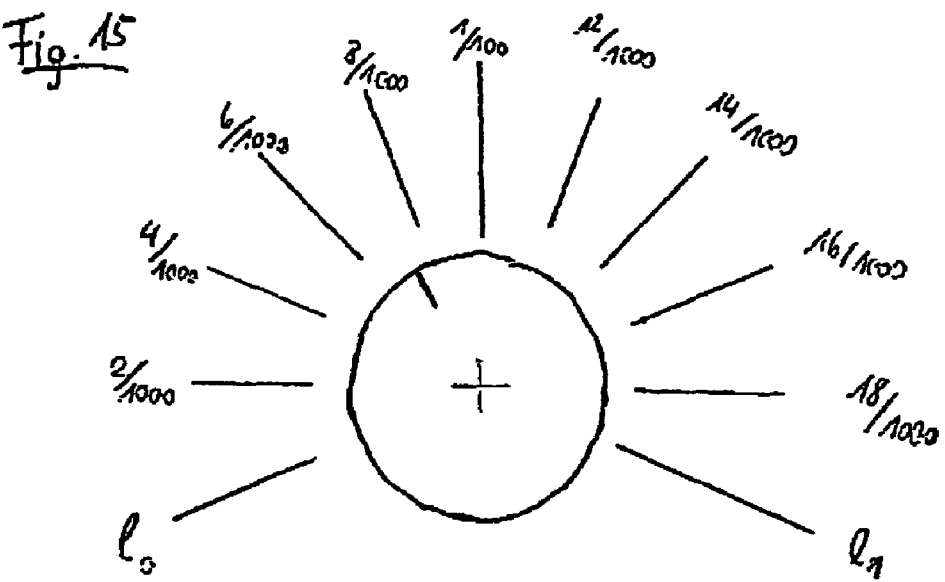
FIG. 15 is a scale on a rotary controller on which the cutter adjustment can be read off per angular segment.

FIG. 15 shows a scale as described above. In the shown example, an angular segment of 22.5° corresponds to a positional adjustment of the cutter by $2/1000$ mm. The scale thus represents a linear transfer function of the screw turning to adjust the cutter ($\phi/e$).

Figure 14:
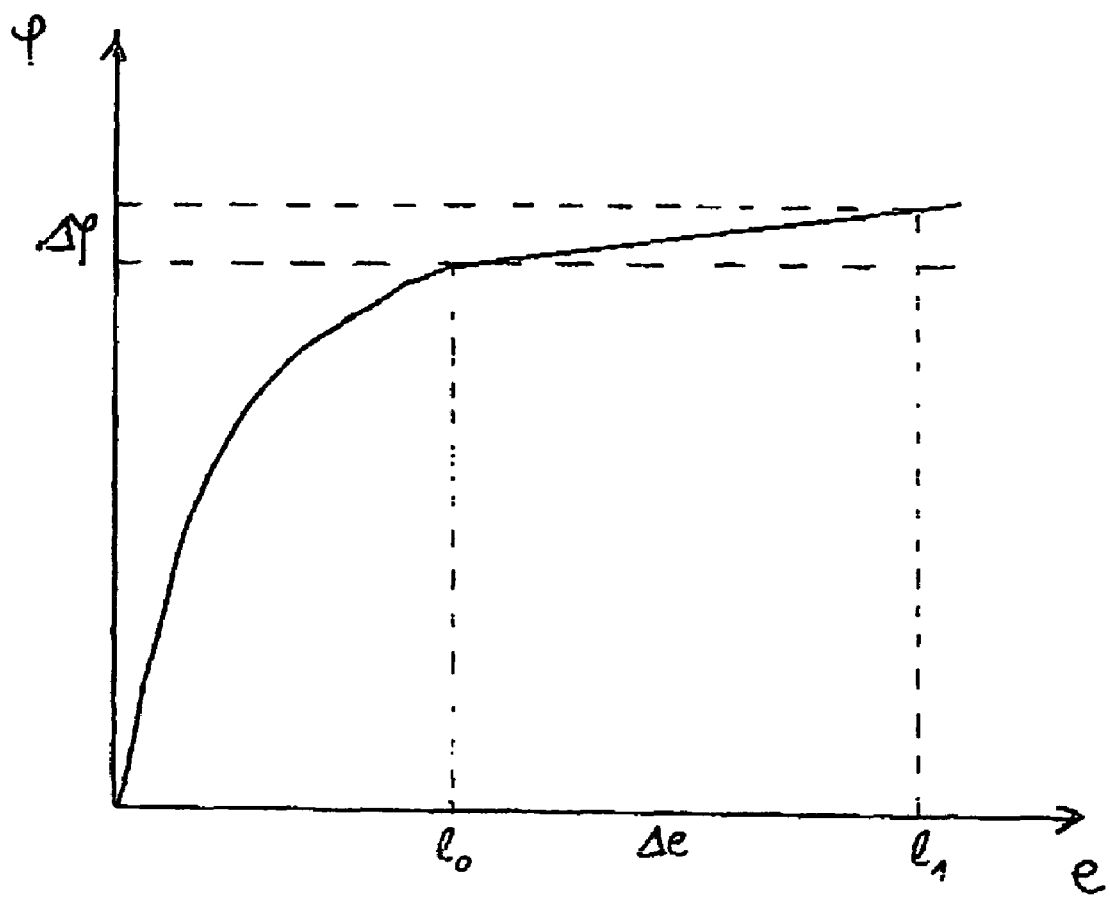
FIG. 14 is a chart in which the transfer function of an adjustment device according to the invention is plotted quantitatively.

A transfer function of this sort can be taken quantitatively from FIG. 14. It is shown that after an initially underproportional rise in the cutter adjustment per angular segment screw turn, a linear relationship (screw turn/cutter adjustment) ensues ($l_0$). The linear region between the two points $l_0$ and $l_1$ ($\Delta l$) is shown on the scale in FIG. 15. A screw turn of 135° ($\Delta\phi$) corresponds to a cutter adjustment of $2/100$ mm ($\Delta l$). The operator obtains the start point $l_0$ of the measurement range in that it concerns the first screw turn in which the operator must exert force which exceeds a certain value.

Naturally, deviations from the shown variants are possible without leaving the basic idea of the invention.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

In particular, a pressure measurement in the pressure chamber could be provided using piezo sensors, it being possible for the cutter adjustment to take place via an allocation of pressure values to corresponding adjustment values. An automated cutter adjustment could also be implemented in this manner.

The invention claimed is:

1. An adjustment device for adjusting the position of at least one cutter of a fine machining tool with respect to a cutter support, the cutter support having a longitudinal axis, the adjustment device comprising:
the cutter support bordering at least one enclosed pressure chamber which is arranged in an adjustment direction of the at least one cutter with a displacement with respect to the at least one cutter and which is filled with a pressure transfer means which can be placed under pressure with a pressure generation device, wherein
between the at least one cutter and the at least one pressure chamber a cutter support wall remains which bulges elastically upon application of pressure by the pressure transfer means to adjust the position.

2. The adjustment device according to claim 1, wherein the at least one cutter and the at least one pressure chamber are arranged in alignment in the adjustment direction.

3. The adjustment device according to claim 1, wherein the length (LD) of the at least one pressure chamber in the orthogonal direction to the adjustment direction corresponds essentially to the length (LS) of the at least one cutter.

4. The adjustment device according to claim 1, wherein the length of the pressure chamber in the orthogonal direction to the adjustment direction is limited to the region of a tool corner corresponding to the at least one cutter.

5. The adjustment device according to claim 1, wherein the elastic deformation between the at least one pressure chamber and the at least one cutter lies in the size range of the cutter adjustment.

6. The adjustment device according to claim 1, wherein the pressure transfer means is an at least approximately incompressible fluid.

7. The adjustment device according to claim 1, wherein the pressure generation device includes a screw which can be screwed into a blind threaded hole.

8. The adjustment device according to claim 7, wherein the blind threaded hole is separated by an axial distance from the at least one pressure chamber and is connected to the at least one pressure chamber via connecting channels.

9. The adjustment device according to claim 7, wherein there is a predetermined relationship between an input quantity of the pressure generation device and the resulting positional adjustment of the at least one cutter.

10. The adjustment device according to claim 1, wherein the position of the at least one cutter is adjustable in the radial direction.

11. The adjustment device according to claim 1, wherein the at least one pressure chamber is formed with a ring shape.

12. The adjustment device according to claim 1, wherein the cutter support is a tool mounting basic element.

13. An adjustment device according to claim 12, wherein the tool mounting basic element includes a central tool holder with an assigned expansion chuck.

14. The adjustment device according to claim 13, wherein the adjustment device and the expansion chuck have separate pressure chambers which have a pressure coupling.

15. A fine machining tool comprising an adjustment device according to claim 1.

* * * * *